United States Patent
Baset et al.

(10) Patent No.: US 9,792,110 B2
(45) Date of Patent: Oct. 17, 2017

(54) AUTOMATIC ONLINE SYSTEM UPGRADE

(71) Applicant: International Business Machines Corporation, Armonk, NY (US)

(72) Inventors: Salman A. Baset, New York, NY (US); Bao Hua Dai, Beijing (CN); Shu Tao, Irvington, NY (US); Tao Tao, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,725

(22) Filed: Dec. 21, 2015

(65) Prior Publication Data

US 2017/0177323 A1   Jun. 22, 2017

(51) Int. Cl.
  *G06F 9/44* (2006.01)
  *G06F 9/445* (2006.01)
  *H04L 29/08* (2006.01)

(52) U.S. Cl.
  CPC ............... *G06F 8/65* (2013.01); *H04L 67/34* (2013.01)

(58) Field of Classification Search
  None
  See application file for complete search history.

(56) References Cited

U.S. PATENT DOCUMENTS

| | | | | |
|---|---|---|---|---|
| 8,296,419 | B1* | 10/2012 | Khanna | G06F 9/5072 709/201 |
| 8,321,858 | B1* | 11/2012 | Marmaros | G06F 8/65 717/173 |
| 8,677,348 | B1 | 3/2014 | Ramanathpura et al. | |
| 8,819,106 | B1* | 8/2014 | Sirota | G06F 9/485 709/201 |
| 9,075,670 | B1* | 7/2015 | Nick | G06F 9/5033 |
| 2004/0051731 | A1* | 3/2004 | Chang | H04L 69/329 715/734 |
| 2004/0187103 | A1* | 9/2004 | Wickham | G06F 8/65 717/168 |
| 2006/0265420 | A1* | 11/2006 | Macnaughton | G06F 17/30362 |
| 2007/0033445 | A1 | 2/2007 | Hirsave et al. | |
| 2009/0089777 | A1* | 4/2009 | Fuller | G06F 8/65 717/174 |
| 2009/0100419 | A1* | 4/2009 | Childress | G06F 8/65 717/171 |
| 2009/0144720 | A1* | 6/2009 | Roush | G06F 8/65 717/171 |

(Continued)

OTHER PUBLICATIONS

Al-Dabbas, How to Configure VMware Affinity Rules for DRS and Storage DRS, pp. 1-19, Jan. 17, 2013, Pluralsight.com.*

(Continued)

*Primary Examiner* — Insun Kang
(74) *Attorney, Agent, or Firm* — Scully, Scott, Murphy & Presser, P.C.; Louis J. Percello, Esq.

(57) ABSTRACT

Automatically upgrading a computing environment system may include automatically identifying a set of timeframes and nodes running user applications on physical machines, containers, or virtual machines (VMs) whose disruption during the identified timeframes minimally impact the user applications. The timeframes may be intelligently determined by leveraging the monitoring data obtained automatically and/or the hints supplied by the user.

13 Claims, 3 Drawing Sheets

(56) References Cited

U.S. PATENT DOCUMENTS

| | | | |
|---|---|---|---|
| 2009/0187899 A1* | 7/2009 | Mani | G06F 8/65 717/168 |
| 2011/0246574 A1* | 10/2011 | Lento | G06Q 10/10 709/204 |
| 2012/0210310 A1* | 8/2012 | Cooley | G06F 8/65 717/168 |
| 2012/0210311 A1* | 8/2012 | Kikuchi | G06F 8/65 717/168 |
| 2012/0311154 A1* | 12/2012 | Morgan | H04L 12/6418 709/226 |
| 2013/0074061 A1* | 3/2013 | Averbuch | G06F 8/665 717/171 |
| 2013/0117738 A1* | 5/2013 | Livingston | G06F 11/1433 717/168 |
| 2013/0263104 A1* | 10/2013 | Baset | G06F 8/70 717/168 |
| 2013/0275741 A1* | 10/2013 | Bates | G06F 8/65 713/100 |
| 2013/0283252 A1 | 10/2013 | Mannarswamy et al. | |
| 2014/0237463 A1* | 8/2014 | Sriram | G06F 8/65 717/172 |
| 2014/0304695 A1* | 10/2014 | Gambardella | H04L 65/80 717/168 |
| 2014/0310709 A1* | 10/2014 | Nirantar | G06F 9/485 718/1 |
| 2014/0317174 A1* | 10/2014 | Feng | H04L 41/082 709/203 |
| 2015/0012624 A1* | 1/2015 | Geiger | H04L 43/0817 709/221 |
| 2015/0149989 A1* | 5/2015 | Lu | G06F 8/65 717/170 |
| 2015/0169311 A1* | 6/2015 | Dickerson | G06F 8/65 717/170 |
| 2015/0195220 A1* | 7/2015 | Hawker | H04L 51/02 709/206 |
| 2015/0234649 A1* | 8/2015 | Sugiura | G06F 8/71 717/170 |
| 2015/0294222 A1* | 10/2015 | Toon | G06N 5/022 706/11 |
| 2015/0381410 A1* | 12/2015 | Strassner | G06N 5/048 709/220 |
| 2016/0036878 A1* | 2/2016 | Nick | H04L 65/60 709/231 |
| 2016/0103673 A1* | 4/2016 | Curran | G06F 8/65 717/168 |

OTHER PUBLICATIONS

"How to use Affinity and Anti-Affinity in OpenStack Icehouse," 2014, Cloudwatt.*

* cited by examiner

AUTOMATIC ONLINE SYSTEM UPGRADE

FIELD

The present application relates generally to computers and computer applications, and more particularly to automatic online system upgrade.

BACKGROUND

In today's computing environment, user's satisfaction is largely dependent on the continuous non-stop service availability. However, system upgrade is inevitable and may even need to be very frequent, for example, for patches and intra-release upgrades that provide minor fixes and feature additions and does not require data model changes.

Traditional upgrades in a computing environment such Infrastructure as a Service (IaaS) requires a designated maintenance window, during which the disruption of service may occur. This disruption of service may have a significant impact on the user or customer who would like to access the service, and may result in lower user or customer satisfaction to the service. On one hand, if the service of the computing environment is offered globally, choosing an appropriate maintenance window is difficult and may be dependent on geographical locations. Considering that the system patches or intra-release upgrades may be as frequent as weekly, the negative impact of traditional maintenance window approach can be significant.

BRIEF SUMMARY

A computer-implemented method and system of automatically selecting and upgrading a computing environment system may be provided. The method, in one aspect, may include determining a candidate timeframe that requires a least number of compute nodes for supporting an overall service performance. The method may also include, for the candidate timeframe, determining the number of requests the compute nodes are processing during the candidate timeframe. The method may also include inserting or storing identifiers of the compute nodes in a queue on a memory device. In one aspect, the compute nodes are placed in the queue in the order of the least number of requests the compute nodes are processing during the candidate timeframe. The method may also include selecting the compute nodes from the queue that are available to upgrade in the order of the least number of request. The method may further include upgrading the compute nodes until the candidate timeframe expires.

A system for automatically upgrading a computing environment, in one aspect, may include one or more hardware processors and a memory device coupled to one or more of the hardware processors. One or more of the hardware processors may be operable to determine a candidate timeframe that requires a least number of compute nodes for supporting an overall service performance. For the candidate timeframe, one or more of the hardware processors may be further operable to determine number of requests the compute nodes are processing during the candidate timeframe. One or more of the hardware processors may be further operable to place identifiers of the compute nodes in a queue on a memory device in an order of least number of requests the compute nodes are processing during the candidate timeframe. One or more of the hardware processors may be further operable to select the compute nodes from the queue that are available to upgrade in the order of the least number of request. One or more of the hardware processors may be further operable to upgrade the compute nodes until the candidate timeframe expires.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A real-time patch or intra-release online upgrade method and system are presented that perform upgrades without a dedicated maintenance window. In one embodiment, the method and system allow each physical node to select its own upgrade time and schedule an upgrade automatically given a generic rule while maintaining the overall system to be up and running.

In one embodiment, an administrator or technical personnel may provide the upgrade packages and specify the timeframe for the overall upgrade. Each physical node automatically and jointly decides the upgrade sequence with minimal user experience downgrade. In one aspect, the method and system may provide risk driven patching in a cloud management system.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessnesss, low coupling, modularity, and semantic interoperability. At the heart of cloud computing is an infrastructure comprising a network of interconnected nodes (computers/processors). It is understood in advance that although this disclosure includes a description on cloud computing, implementation of the teachings recited herein are not limited to a cloud computing environment. Rather, embodiments disclosed herein are capable of being implemented in conjunction with any other type of computing environment now known or later developed, as applicable.

In one embodiment, the following assumptions may be considered: 1. Upgrade does not affect database schema and is compatible with the existing service; 2. Upgrade time spent on each controller/compute node is known; 3. Upgrade on each node is independent of each other.

In one embodiment, the service availability is defined in terms of user's request fulfillment guarantees. The following data may be identified: 1. The number of applications, virtual machines (VMs) or containers running on each of compute node; 2. Each application, VM or container's access time by the end user; 3. The requests that needs to be processed by the controller and compute nodes; 4. The requests that needs to be handled by the application, VM or containers only; 5. The scheduling algorithm of the compute nodes for the provisioning. 6. Network connectivity information for applications, VMs or containers. The cloud provider or the like may have access to this data, for example, through monitoring and utilization systems.

In one embodiment, the method and system calculate the potential impact of each node's upgrade to the service availability. The potential impact varies according to the potential requests to the target node during the time of upgrade. Based on the potential impact, the method and system in one embodiment determine the appropriate upgrade times to achieve the minimal risk to the availability of the computing environment's resources and the minimal impact to the end users.

Figure 1:
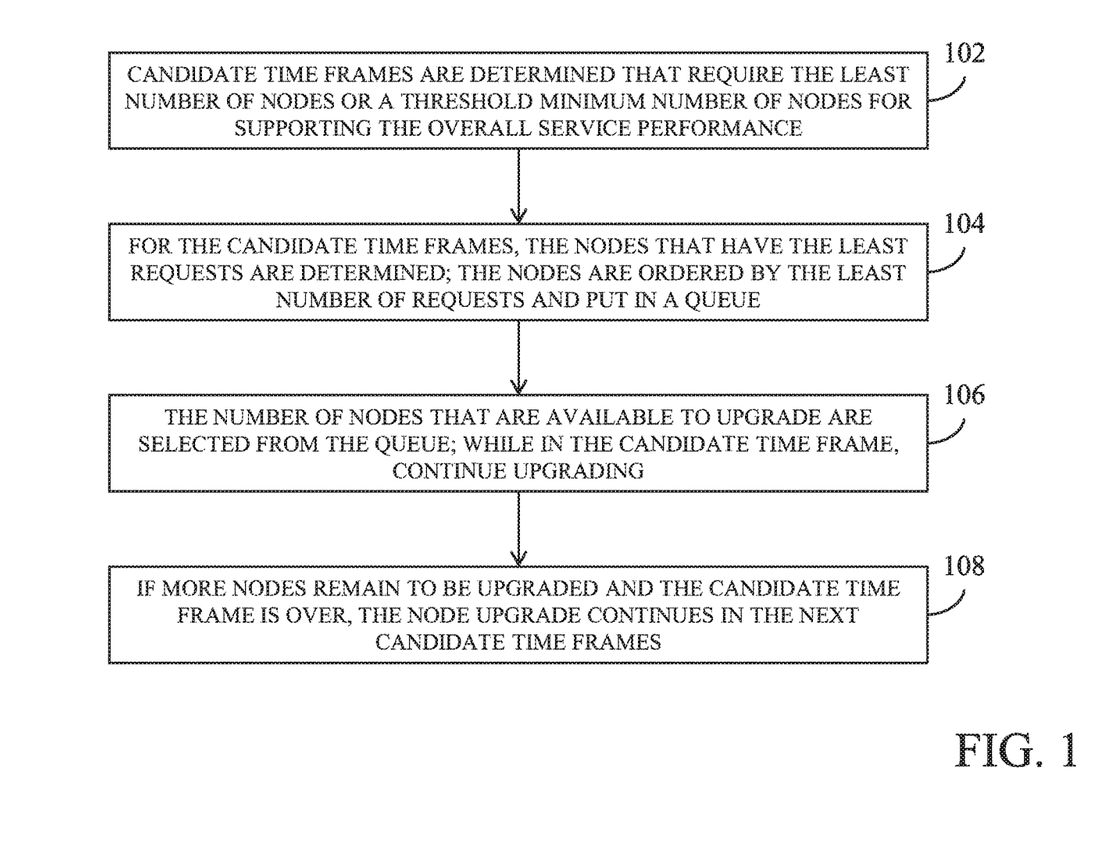
FIG. 1 is a flow diagram illustrating a method of the present disclosure in one embodiment.

FIG. 1 is a flow diagram illustrating a method of the present disclosure in one embodiment. At 102, candidate time frames are determined that require the least or smallest number of compute nodes for supporting the overall service performance. For instance, the applications, VMs or containers running on a host or set of hosts may belong to one or more users. An embodiment of a method of the present disclosure may automatically identify the time frames such that during that timeframe the activity of applications, VMs or containers that belong to multiple users running on multiple hosts is small, for example, below a threshold number, for example, according to a predefined criteria. Such timeframes may be determined by leveraging the data from a monitoring system, which for example, monitors the central processing unit (CPU), network, memory, network utilization, and network traffic patterns among the applications, VMs, or containers. As a particular example, the network traffic pattern among applications, VMs or containers is used to identify which VMs or containers may not have received traffic for a given threshold amount of time, or which applications, VMs or containers may be acting as passive in an active-passive high availability (HA) cluster. Briefly, an HA cluster are groups of computers that support redundancy, for example, for continued service even when a system component fails. Furthermore, a user may also provide hints to the cloud provider or the like service or system provider, for example, as to which applications, VMs or containers are active and which are passive in an HA cluster, for example, at different times. This information in one embodiment of the present disclosure is used to identify candidate timeframes.

At 104, for the candidate time frames, for example, for each candidate time frame, the compute nodes that have the least requests are determined. For example, the number of requests the compute nodes are or will be processing during a candidate timeframe may be determined, and the compute nodes may be ordered by the number of requests a compute node has for processing during that candidate time frame.

The number of requests for the nodes and the nodes with least requests may be determined using a methodology similar to identifying the candidate time frames described above, for example, leveraging the similar type of data or information. For example, system monitoring may discover the number of requests at a node. As another example, a user may provide hints about the requests being performed or handled by a node. Such information may be used to determine which compute nodes have how many requests, that is, the number of requests a compute node is processing during that timeframe or time window. The compute nodes are ordered by least requests and put (stored) in a queue in memory. Multiple nodes may occupy an entry within a queue. For instance, the first entry in the queue may have one or more compute nodes (or identifiers of compute nodes) that have the smallest number of requests; the second entry in the queue may have one or more compute nodes (or identifiers of compute nodes) that have the next smallest number of requests; and so on.

At 106, the number of nodes that are available to upgrade are selected from the queue, for example, in the order they are placed in the queue. In one embodiment, the selected nodes from a queue entry are upgraded in a parallel fashion. When a node is upgraded, the next candidate node is selected from the queue and the upgrading of the next candidate node continues until the candidate time frame is over or expires.

At 108, if more nodes remain to be upgraded and the candidate time frame is over, the node upgrade continues in the next candidate time frames.

Figure 2:
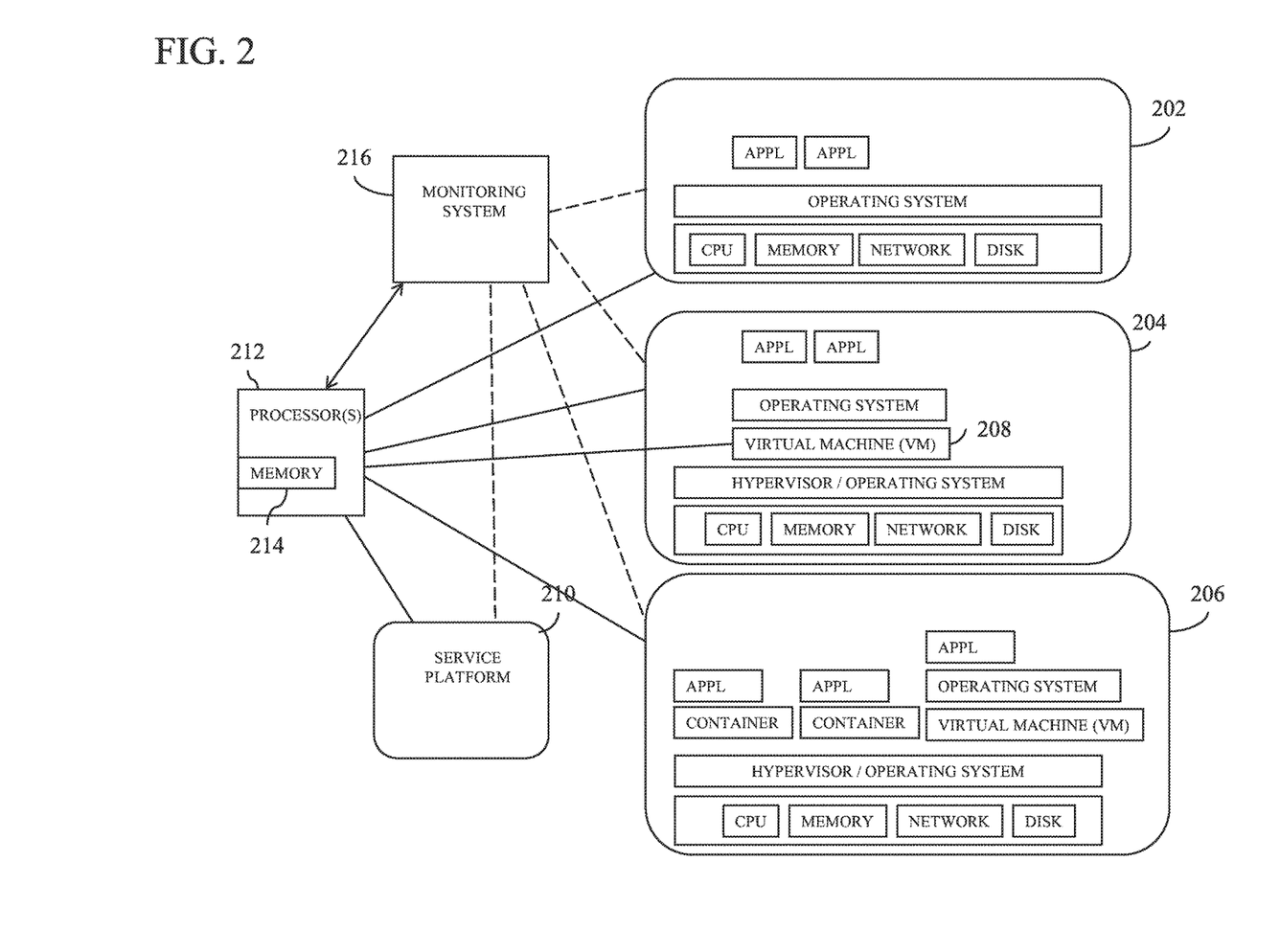
FIG. 2 is a diagram illustrating components of a system of the present disclosure in one embodiment.

FIG. 2 is a diagram illustrating components of a system of the present disclosure that may perform automatic upgrading of computing environment in one embodiment. A computing environment may include one or more compute nodes 202, 204, 206, 208, 210. A compute node, for example, may be a physical machine, for example, which may include host hardware, central processing unit, memory, network device and facilities, disk or another storage device. A compute node may include one or more hypervisors that can host a single operating system, different operating systems and/or containers, on which one or more application may run, e.g., as shown at 206. A compute node may include one or virtual machines which may run one or more applications, for example, as shown at 204. A compute node may include hardware hosting an operating system on which one or more applications may run, for example, as shown at 202. A compute node may be a virtual machine, for example, shown at 208. A compute node may refer to a service platform, for example, hardware and software allocated for providing a service, such as a web service, database service, another application service, for example, as shown at 210. In the configurations shown in FIG. 2, there may be apps or applications on hosts, apps or applications in VMs on hosts, and apps or applications in containers, which in turn run on hosts or VMs.

One or more hardware processors 212, for example, coupled to a memory device 214, may determine a candidate timeframe that requires the least number of compute nodes for supporting an overall service performance. The number of compute nodes that may be required at different timeframes or time windows may be determined by automatically correlating data from one or more monitoring systems 216. For instance, a monitoring system 216 may monitor and log various information regarding compute nodes, e.g., 202, 204, 206, 208, 210. For instance, monitoring system 216 may discover or determine whether one or more compute nodes are running entities such as applications, virtual machines, or containers with no network traffic, whether one or more compute nodes are running entities such as applications, virtual machines, or containers with a threshold amount of network traffic. The monitoring system 216 may also discover or determine one or more compute nodes or entities such as applications, virtual machines, or containers running on compute nodes with a threshold level of central processing unit (CPU) processing identified as low, one or more compute nodes or entities such as applications, virtual machines, or containers, with a threshold level of memory processing identified as low, one or more compute nodes with a threshold level of network processing identified as low, one or more compute nodes with a threshold level of physical machine disk, virtual machine disk or container disk utilization, compute nodes running entities such as applications, virtual machines, or containers that are communicating among one another, or combinations thereof. Other mechanism may be used to determine the timeframe during which least number of compute nodes are required.

The number of compute nodes that may be required at different timeframes or time windows may be determined based on user supplied hints. For instance, a user may input, e.g., via user interface or an input file, hints regarding the compute nodes at different timeframes. The user supplied hints may include one or more of scheduling of one or more entities such as a virtual machine, an application and/or a container on the compute nodes, affinity of the entities, anti-affinity of the entities, whether the entities are co-located or spread across the compute nodes, one or more active entities running on compute nodes in a high availability cluster, or one or more passive entities running on compute nodes in a high availability cluster, or combinations thereof. Other hints may be received.

For the candidate timeframe, one or more of hardware processors 212 may determine the number of requests the compute nodes (e.g., 202, 204, 206, 208, 210) are processing during the candidate timeframe.

One or more hardware processors 212 may insert identifiers of the compute nodes in a queue on a memory device (e.g., 214) in the order of least number of requests the compute nodes are processing during the candidate timeframe. An entry in the queue may include a plurality of the compute nodes.

One or more hardware processors 212 may select the compute nodes from the queue that are available to upgrade in the order of the least number of request, for instance, the order in which the compute nodes were inserted into the queue.

One or more the hardware processors 212 may upgrade the selected compute nodes until the candidate timeframe expires. In one embodiment, if a selected queue entry contains more than one compute node, those multiple compute nodes identified in the entry in the queue are upgraded in parallel.

If more of the compute nodes remain in the queue that have not been upgraded in the candidate time frame, one or more hardware processors 212 may upgrade the compute nodes that remain in the next candidate timeframe. For example, the entries in the queue may persist and in the next iteration of performing the automatic upgrading, the queue entries from the last iteration or previous iteration may be processed. In one embodiment, the queue entries from the last or previous iteration may be processed before the queue entries inserted in the current iteration are processed, for example, if the compute nodes identified in the queue entries of the previous iteration still have low number (e.g., compared to a threshold number) of requests in the current timeframe.

Figure 3:
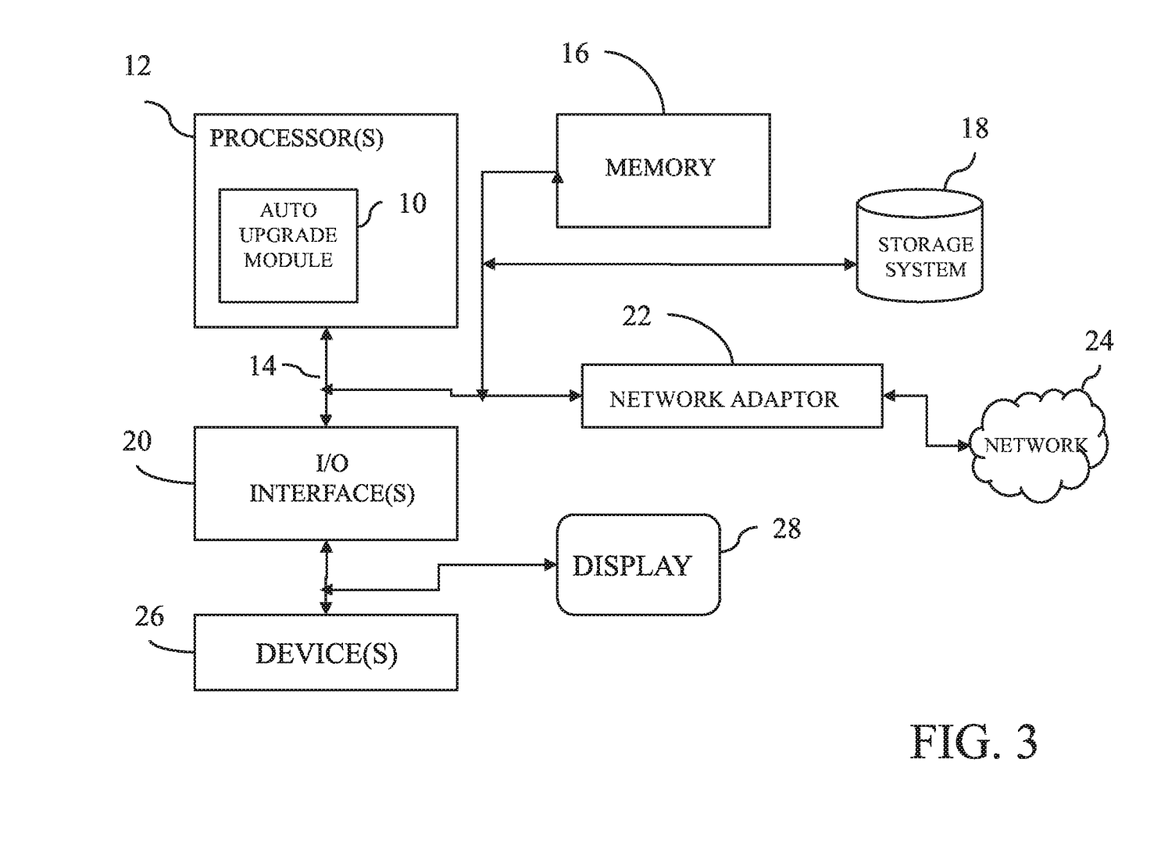
FIG. 3 illustrates a schematic of an example computer or processing system that may implement a system in one embodiment of the present disclosure.

FIG. 3 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automatically upgrading a computing environment system, comprising:
    determining, by one or more hardware processors, a candidate timeframe that requires a least number of compute nodes for supporting an overall service performance, the determining the candidate timeframe comprising determining which applications, virtual machines and containers are active and which are passive in a high availability cluster at different times;
    for the candidate timeframe, determining by one or more of the hardware processors, number of requests the compute nodes are processing during the candidate timeframe;
    storing by one or more of the hardware processors, identifiers of the compute nodes in a queue on a memory device in an order of least number of requests the compute nodes are processing during the candidate timeframe, wherein the compute nodes are ordered by the number of requests a compute node has for processing during the candidate timeframe and wherein multiple compute nodes occupy an entry within the queue;
    selecting by one or more of the hardware processors, the compute nodes from the queue that are available to upgrade in the order of the least number of requests, wherein the multiple compute nodes occupying the entry selected from the queue are upgraded in parallel; and
    upgrading by one or more of the hardware processors, the compute nodes until the candidate timeframe expires, wherein the least number of nodes is determined based on user supplied hints comprising affinity of the entities, anti-affinity of the entities, and whether the entities are co-located or spread across the compute nodes.

2. The method of claim 1, further comprising:
    if more of the compute nodes remain in the queue that have not been upgraded in the candidate time frame, using a next candidate timeframe to upgrade the compute nodes that remain.

3. The method of claim 1, wherein the least number of compute nodes is determined by automatically correlating data from one or more monitoring systems.

4. The method of claim 3, wherein automatically correlating data comprises determining whether one or more compute nodes are running one or more entities comprising one or more of an application, virtual machine or container with no network traffic, whether one or more compute nodes are running the entities with a threshold amount of network traffic, one or more compute nodes or entities running on compute nodes with a threshold level of central processing unit processing identified as low, one or more compute nodes or entities with a threshold level of memory processing identified as low, one or more compute nodes with a threshold level of network processing identified as low, one or more compute nodes with a threshold level of physical machine disk utilization, one or more compute nodes with a threshold level of virtual machine disk utilization, one or more compute nodes with a threshold level of container disk utilization, and compute nodes running entities that are communicating among one another.

5. The method of claim 1, wherein the user supplied hints further comprises scheduling of entities comprising one or more of an application, virtual machine, or container on the compute nodes, one or more active entities running on compute nodes in a high availability cluster, and one or more passive entities running on compute nodes in a high availability cluster.

6. A system for automatically upgrading a computing environment, comprising:
    one or more hardware processors; and
    a memory device coupled to one or more of the hardware processors,
    one or more of the hardware processors configured to determine a candidate timeframe that requires a least number of compute nodes for supporting an overall service performance, by at least determining which applications, virtual machines and containers are active and which are passive in a high availability cluster at different times,
    for the candidate timeframe, one or more of the hardware processors further configured to determine number of requests the compute nodes are processing during the candidate timeframe,
    one or more of the hardware processors further configured to insert identifiers of the compute nodes in a queue on the memory device in an order of least number of requests the compute nodes are processing during the candidate timeframe, wherein the compute nodes are ordered by the number of requests a compute node has for processing during the candidate timeframe and wherein multiple compute nodes occupy an entry within the queue,
    one or more of the hardware processors further configured to select the compute nodes from the queue that are available to upgrade in the order of the least number of request, wherein the multiple compute nodes occupying the entry selected from the queue are upgraded in parallel, one or more of the hardware processors further configured to upgrade the compute nodes until the candidate timeframe expires, wherein the least number of nodes is determined based on user supplied hints comprising affinity of the entities, anti-affinity of the entities, and whether the entities are co-located or spread across the compute nodes.

7. The system of claim 6, wherein if more of the compute nodes remain in the queue that have not been upgraded in the candidate time frame, one or more of the hardware processors are further configured to upgrade the compute nodes that remain in a next candidate timeframe.

8. The system of claim 6, wherein the least number of compute nodes is determined by automatically correlating data from one or more monitoring systems.

9. The system of claim 8, wherein automatically correlating data comprises determining whether one or more compute nodes are running one or more entities comprising one or more of an application, virtual machine or container with no network traffic, whether one or more compute nodes are running entities with a threshold amount of network traffic, one or more compute nodes or entities running on compute nodes with a threshold level of central processing unit processing identified as low, one or more compute nodes or entities with a threshold level of memory processing identified as low, one or more compute nodes with a threshold level of network processing identified as low, one or more compute nodes with a threshold level of physical machine disk utilization, one or more compute nodes with a threshold level of virtual machine disk utilization, one or more compute nodes with a threshold level of container disk utilization, compute nodes running entities that are communicating among one another, or combinations thereof.

10. The system of claim 6, wherein the user supplied hints further comprises scheduling of entities comprising one or more of an application, virtual machine, or container on the compute nodes, one or more active entities running on compute nodes in a high availability cluster, and one or more passive entities running on compute nodes in a high availability cluster.

11. A non-transitory computer readable storage medium storing a program of instructions executable by a machine to perform a method of automatically upgrading a computing environment system, the method comprising:

determining a candidate timeframe that requires a least number of compute nodes for supporting an overall service performance, the determining the candidate timeframe comprising determining which applications, virtual machines and containers are active and which are passive in a high availability cluster at different times;

for the candidate timeframe, determining number of requests the compute nodes are processing during the candidate timeframe;

storing identifiers of the compute nodes in a queue on a memory device in an order of least number of requests the compute nodes are processing during the candidate timeframe wherein the compute nodes are ordered by the number of requests a compute node has for processing during the candidate timeframe and wherein multiple compute nodes occupy an entry within the queue;

selecting the compute nodes from the queue that are available to upgrade in the order of the least number of requests, wherein the multiple compute nodes occupying the entry selected from the queue are upgraded in parallel; and upgrading the compute nodes until the candidate timeframe expires, wherein the least number of nodes is determined based on user supplied hints comprising affinity of the entities, anti-affinity of the entities, and whether the entities are co-located or spread across the compute nodes.

12. The computer readable storage medium of claim 11, further comprising:

if more of the compute nodes remain in the queue that have not been upgraded in the candidate time frame, using a next candidate timeframe to upgrade the compute nodes that remain.

13. The computer readable storage medium of claim 11, wherein the least number of compute nodes is determined by one or more of, automatically correlating data from one or more monitoring systems and user supplied hints, wherein automatically correlating data comprises determining whether one or more compute nodes are running one or more entities comprising one or more of an application, virtual machine or container with no network traffic, whether one or more compute nodes are running one or more entities comprising one or more of an application, VM, or container with a threshold amount of network traffic, one or more compute nodes or entities running on compute nodes with a threshold level of central processing unit processing identified as low, one or more compute nodes or entities with a threshold level of memory processing identified as low, one or more compute nodes with a threshold level of network processing identified as low, one or more compute nodes with a threshold level of physical machine disk utilization, one or more compute nodes with a threshold level of virtual machine disk utilization, one or more compute nodes with a threshold level of container disk utilization, compute nodes running entities that are communicating among one another, or combinations thereof, wherein the user supplied hints comprises one or more of scheduling of entities on the compute nodes, affinity of the entities, anti-affinity of the entities, whether the entities are co-located or spread across the compute nodes, one or more active entities running on compute nodes in a high availability cluster, or one or more passive entities running on compute nodes in a high availability cluster, or combinations thereof.

* * * * *